US012811431B2

(12) United States Patent
Imanaka

(10) Patent No.: US 12,811,431 B2
(45) Date of Patent: Nov. 24, 2026

(54) ENERGY STORAGE APPARATUS AND METHOD OF MANAGING TEMPERATURE OF COMPONENT TO WHICH ELECTRICITY IS SUPPLIED

(71) Applicant: GS Yuasa International Ltd., Kyoto (JP)

(72) Inventor: Yuki Imanaka, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 612 days.

(21) Appl. No.: 18/549,688

(22) PCT Filed: Mar. 4, 2022

(86) PCT No.: PCT/JP2022/009491
§ 371 (c)(1),
(2) Date: Sep. 8, 2023

(87) PCT Pub. No.: WO2022/196398
PCT Pub. Date: Sep. 22, 2022

(65) Prior Publication Data

US 2024/0154450 A1 May 9, 2024

(30) Foreign Application Priority Data

Mar. 17, 2021 (JP) ................................ 2021-043246

(51) Int. Cl.

| | |
|---|---|
| ***H02J 7/90*** | (2026.01) |
| ***H01M 10/42*** | (2006.01) |
| ***H01M 10/44*** | (2006.01) |
| ***H01M 10/48*** | (2006.01) |
| ***H02J 7/80*** | (2026.01) |

(52) U.S. Cl.
CPC ......... *H02J 7/977* (2026.01); *H01M 10/4257* (2013.01); *H01M 10/443* (2013.01);
(Continued)

(58) Field of Classification Search
CPC ... H02J 7/977; H01M 10/4257; H01M 10/443
(Continued)

(56) References Cited

U.S. PATENT DOCUMENTS 11,658,503 B2 * 5/2023 Arizono .............. H01M 10/443 320/137
2009/0267568 A1 10/2009 Lim
(Continued)

FOREIGN PATENT DOCUMENTS

EP 3663051 A1 6/2020
JP 2009-005577 A 1/2009
(Continued)

OTHER PUBLICATIONS

International Search Report and Written Opinion for International Application No. PCT/JP2022/009491, dated May 17, 2022, (8 pages), Japan Patent Office, Tokyo, Japan.

*Primary Examiner* — Allyson N Trail
(74) *Attorney, Agent, or Firm* — Buchalter LLP

(57) ABSTRACT

An energy storage apparatus 50 includes: an energy storage cell 62; a temperature sensor 58 configured to measure a temperature of the energy storage cell 62; a component to which electricity is supplied BSB, the component to which electricity is supplied BSB being disposed on a current path of the energy storage cell 62 and having a smaller heat capacity than that of the energy storage cell 62; and a control unit 130. The control unit 130 is configured to calculate or determine a first time period T1 until a change in temperature of the component to which electricity is supplied BSB reaches a first threshold ΔTcnt based on a current that flows into the energy storage cell 60, the change in temperature being associated with charging and/or discharging of the energy storage cell 62; and is configured to limit the current that flows into the energy storage cell 62 when an electricity supply time period T associated with the charging and/or
(Continued)

discharging of the energy storage cell 62 exceeds the first time period T1 thus setting a difference in temperature between the energy storage cell 62 and the component to which electricity is supplied BSB to a value equal to or less than the first threshold ΔTcnt.

8 Claims, 10 Drawing Sheets

(52) U.S. Cl.
CPC ............. *H01M 10/486* (2013.01); *H02J 7/80* (2026.01); *H01M 2010/4271* (2013.01); *H01M 2220/20* (2013.01)

(58) Field of Classification Search
USPC .......................................................... 320/134
See application file for complete search history.

(56) References Cited

U.S. PATENT DOCUMENTS

2014/0042981 A1 2/2014 Kaizo et al.
2015/0291044 A1* 10/2015 Adachi ................. B60L 3/0046 320/134
2019/0064282 A1* 2/2019 Haga .......................... B60L 3/12
2019/0379092 A1* 12/2019 Schiffer .............. H01M 10/486
2020/0389041 A1* 12/2020 Li ............................ H02H 3/08
2023/0168316 A1* 6/2023 Uchino .................. G01R 31/36 320/137
2023/0400177 A1* 12/2023 Chen ................... F21V 23/0457
2024/0154450 A1* 5/2024 Imanaka ........... H01M 10/4257
2025/0269748 A1* 8/2025 Kim ...................... B60L 53/302
2026/0155672 A1* 6/2026 Abbott ...................... H02J 7/44

FOREIGN PATENT DOCUMENTS

JP 2009-266820 A 11/2009
JP 2014-036521 A 2/2014
JP 2016-025790 A 2/2016
JP 2016-199091 A 12/2016
JP 2017-071299 A 4/2017
JP 2017-093269 A 5/2017
JP 2017-229154 A 12/2017
JP 2020-089110 A 6/2020
JP 2020-099161 A 6/2020

* cited by examiner

ENERGY STORAGE APPARATUS AND METHOD OF MANAGING TEMPERATURE OF COMPONENT TO WHICH ELECTRICITY IS SUPPLIED

CROSS REFERENCE TO RELATED APPLICATIONS

This application is a National Stage Application, filed under 35 U.S.C. § 371, of International Application No. PCT/JP2022/009491, filed Mar. 4, 2022, which international application claims priority to and the benefit of Japanese Application No. 2021-043246, filed Mar. 17, 2021; the contents of both of which as are hereby incorporated by reference in their entireties.

BACKGROUND

Technical Field

The present invention relates to a technique for managing a temperature of a component to which electricity is supplied.

Description of Related Art

An energy storage apparatus includes a current interrupting device. For example, when a current that exceeds an allowable value flows for a certain period, the current interrupting device interrupts the flow of the current so that abnormal heat generation of the energy storage apparatus can be suppressed. As literatures that disclose such a technique, there has been known Patent Documents JP-A-2009-266820 and JP-A-2017-229154.

BRIEF SUMMARY

An energy storage apparatus includes components to which electricity is supplied such as bus bars, a current detection resistor, and a current interrupting device. The component to which electricity is supplied is a component that is disposed on a current path of an energy storage cell, and is energized in response to charging or discharging of the energy storage cell. A component to which electricity is supplied has a smaller heat capacity than that of an energy storage cell and hence, the component is likely to easily rise its temperature due to Joule heat generated when electricity is supplied to the component.

The present invention has been made in view of the above-mentioned circumstances, and an object of the present invention is to manage a temperature of a component to which electricity is supplied in an energy storage apparatus.

An energy storage apparatus includes: an energy storage cell; a temperature sensor configured to measure a temperature of the energy storage cell; a component to which electricity is supplied, the component to which electricity is supplied being disposed on a current path of the energy storage cell and having a smaller heat capacity than that of the energy storage cell; and a control unit, wherein the control unit is configured to calculate or determine a first time period until a change in temperature of the component to which electricity is supplied reaches a first threshold based on a current that flows into the energy storage cell, the change in temperature being associated with charging and/or discharging of the energy storage cell; and the control unit is configured to limit the current that flows into the energy storage cell when an electricity supply time period associated with the charging and/or discharging of the energy storage cell exceeds the first time period thus setting a difference in temperature between the energy storage cell and the component to which electricity is supplied to a value equal to or less than the first threshold.

The present technique is applicable to an energy storage apparatus, and a method of managing a temperature of a component to which electricity is supplied. Further, the present technique is applicable to a temperature control program of a component to which electricity is supplied.

In the energy storage apparatus, a temperature of the component to which electricity is supplied can be managed.

BRIEF DESCRIPTION OF THE FIGURES

FIG. 5 is a block diagram illustrating an electrical configuration of a battery and the like.

DETAILED DESCRIPTION OF VARIOUS EMBODIMENTS

Figure 1:
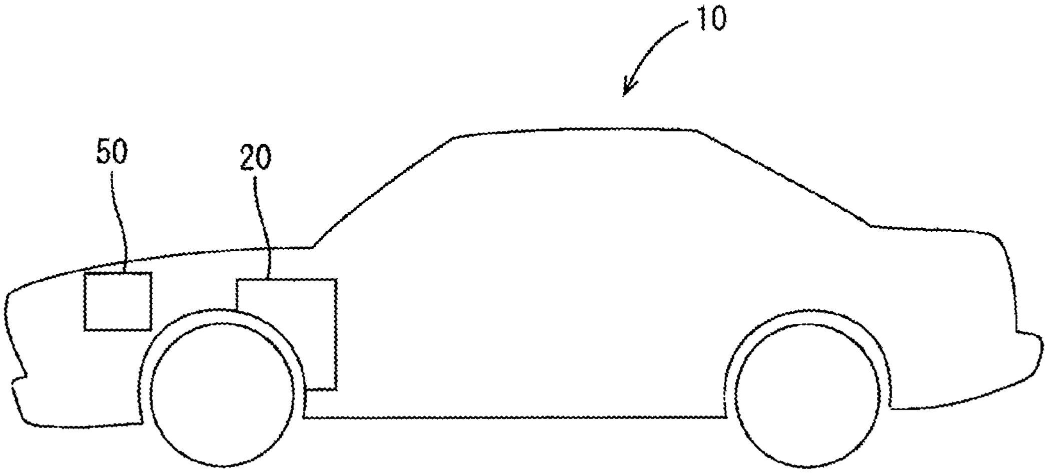
FIG. 1 is a side view of a vehicle.

The overall configuration of an energy storage apparatus will be described.

An energy storage apparatus includes: an energy storage cell; a temperature sensor configured to measure a temperature of the energy storage cell; a component to which electricity is supplied, the component to which electricity is supplied being disposed on a current path of the energy storage cell and having a smaller heat capacity than that of the energy storage cell; and a control unit, wherein the control unit is configured to calculate or determine a first time period until a change in temperature of the component to which electricity is supplied reaches a first threshold based on a current that flows into the energy storage cell, the change in temperature being associated with charging and/or discharging of the energy storage cell; and the control unit is configured to limit the current that flows into the energy storage cell when an electricity supply time period associated with the charging and/or discharging of the energy storage cell exceeds the first time period thus setting a difference in temperature between the energy storage cell and the component to which electricity is supplied to a value equal to or less than the first threshold.

A component to which electricity is supplied that has a small heat capacity is likely to easily increase its temperature due to Joule heat generated when electricity is supplied to the component compared to an energy storage cell that has a large heat capacity. With such a configuration, a difference in temperature between a temperature of the component to which electricity is supplied and a temperature of the energy storage cell can be suppressed to a value equal to or less than the first threshold value. Accordingly, the abnormal heat generation of the component to which electricity is supplied due to charging and/or discharging can be suppressed. By suppressing the abnormal heat generation, it is possible to use the component to which electricity is supplied for a long period and hence, an amount of electricity supplied to the component to which electricity is supplied can be increase. As a result, the battery performance of the energy storage apparatus can be maximized. Further, it is possible to suppress the deterioration of the component to which electricity is supplied due to the abnormal heat generation and hence, the lifetime of the energy storage apparatus can be prolonged.

The control unit may determine the first time period based on an I-T characteristic indicating a relationship between a current and an electricity supply time period with respect to a change in temperature of the component to which electricity is supplied. With such a configuration, the first time period can be determined by referencing a current value of the energy storage cell in the I-T characteristic. By using the I-T characteristic of the component to which electricity is supplied, the prediction accuracy of the change in temperature of the component to which electricity is supplied is enhanced. Accordingly, the temperature of the component to which electricity is supplied can be accurately managed.

In a case where there are a plurality of components to which electricity is supplied having different I-T characteristics, the control unit may determine the first time period based on the I-T characteristic having the shortest electricity supply time period with respect to the same current value among the plurality of I-T characteristics. With such a configuration, it is possible to suppress the occurrence of a situation where the component to which electricity is supplied that is most likely to increase its temperature along with charging and/or discharging, that is, the component to which electricity is supplied that has the I-T characteristic in which the electricity supply time period with respect to the same current value is the shortest causes the abnormal heat generation. Since it is possible to avoid the abnormal heat generation also with respect to other components to which electricity is supplied, the energy storage apparatus can be used for a long period of time and hence, the battery performance of the energy storage apparatus can be maximized.

In a case where there are two components to which electricity is supplied and the I-T characteristics of the two components to which electricity is supplied intersect with each other, the control unit may determine the first time period by selecting the I-T characteristic having the short electricity supply time period with respect to the same current value in two regions with an intersecting point interposed therebetween. With such a configuration, it is possible to perform a temperature control of two component to which electricity is supplied having the I-T characteristics that intersect with each other such that that the difference in temperature with respect to the energy storage cell becomes equal to or less than the first threshold. Accordingly, it is possible to suppress the abnormal heat generation of a plurality of components to which electricity is supplied having I-T characteristics due to charging or discharging of the energy storage cell.

In a case where the charging and/or discharging of the energy storage cell is not limited after the lapse of the first time period, the control unit may calculate or determine a second time period until the change in temperature of the component to which electricity is supplied after the lapse of the first time period reaches a second threshold based on the current of the energy storage cell after the lapse of the first time period, and in a case where the electricity supply time period associated with charging and/or discharging of the energy storage cell after the lapse of the first time period exceeds the second time period, the control unit may cut off the current.

With such a configuration, even if the difference in temperature of the component to which electricity is supplied with respect to the energy storage cell becomes larger than the first threshold due to not performing the current limitation, thereafter, a current is cut off when a change in temperature of the component to which electricity is supplied reaches the second threshold. Since the generation of Joule heat can be suppressed by cutting off the current, it is possible to suppress the further increase of temperature of the component to which electricity is supplied where the change in temperature has reached the second threshold.

The second threshold may be set based on a difference in temperature between an allowable temperature of the component to which electricity is supplied and the temperature of the component to which electricity is supplied at a point of time of the lapse of the first time period. With such a configuration, the current is cut off when the temperature of the component to which electricity is supplied is increased to the allowable temperature. Accordingly, the increase of temperature of the component to which electricity is supplied beyond the allowable temperature can be suppressed. The safety of the energy storage apparatus can be enhanced by suppressing the temperature of the component to which electricity is supplied to a value equal to or less than the allowable temperature.

The energy storage apparatus may not include a temperature sensor for the component to which electricity is supplied. With such a configuration, even when there is no temperature sensor for the component to which electricity is supplied so that a temperature of the component to which electricity is supplied cannot be measured, the difference in temperature of the component to which electricity is supplied with respect to the energy storage cell can be suppressed to the first threshold or less.

Embodiment 1

1. Description of Battery 50

Figure 2:
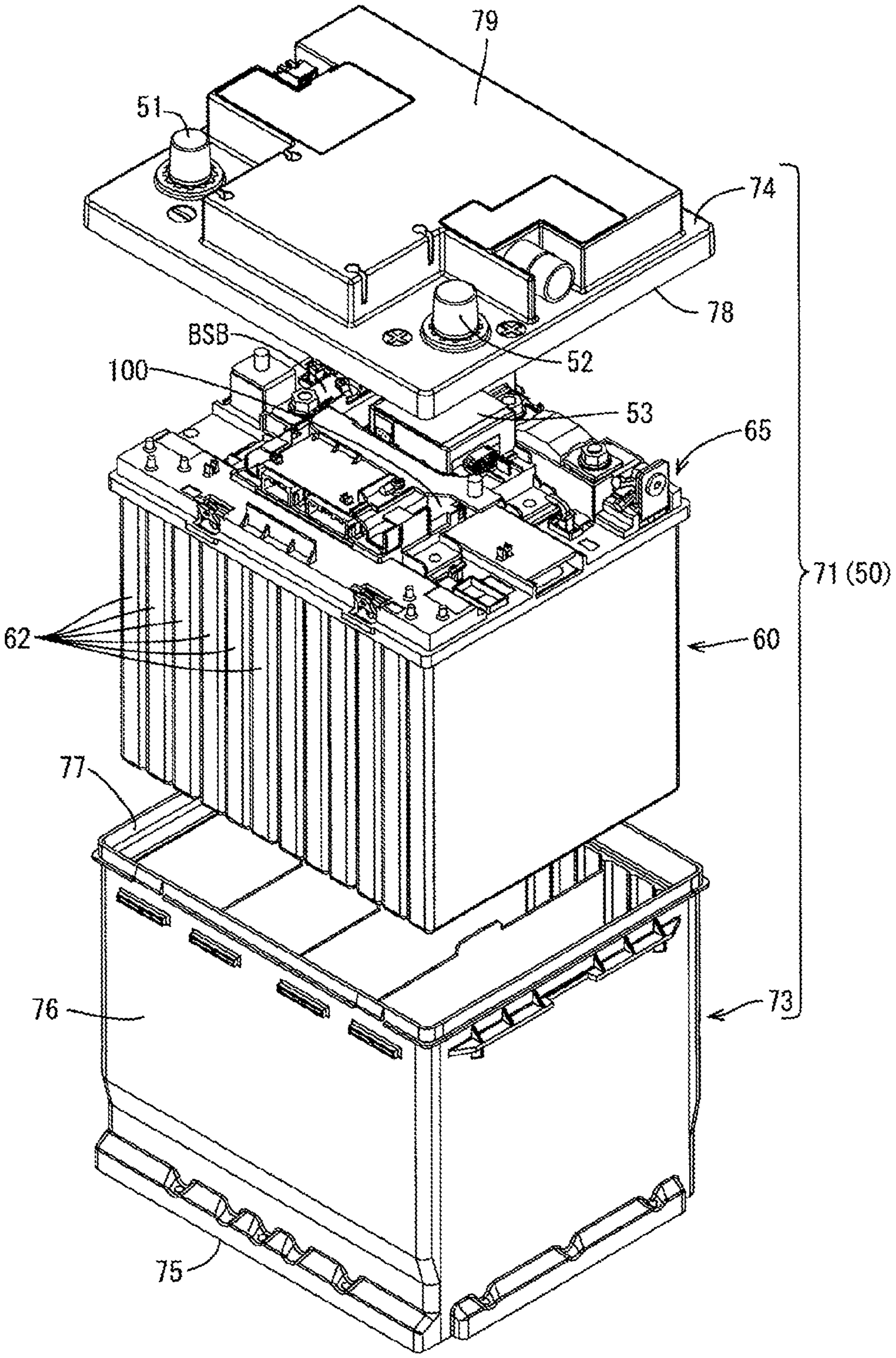
FIG. 2 is an exploded perspective view of a battery.

As illustrated in FIG. 1, an engine 20 and a battery 50 that is used for starting the engine 20 are mounted on a vehicle 10. The battery 50 is an example of "energy storage apparatus". As illustrated in FIG. 2, the battery 50 includes an assembled battery 60, a circuit board unit 65, and a container 71.

The container 71 includes a body 73 made of a synthetic resin material, and a lid body 74. The body 73 has a bottomed cylindrical shape. The body 73 includes a bottom surface portion 75 and four side surface portions 76. An upper opening portion 77 is formed at an upper end portion of the body 73 by four side surface portions 76.

The container 71 contains the assembled battery 60 and a circuit board unit 65. The circuit board unit 65 is disposed above the assembled battery 60.

The lid body 74 closes the upper opening portion 77 of the body 73. An outer peripheral wall 78 is formed on a periphery of the lid body 74. The lid body 74 has a protruding portion 79 having an approximately T shape as viewed in a plan view. On a front portion of the lid body 74, an external terminal 51 of positive electrode is fixed to one corner portion, and an external terminal 52 of a negative electrode is fixed to the other corner portion.

Figure 3:
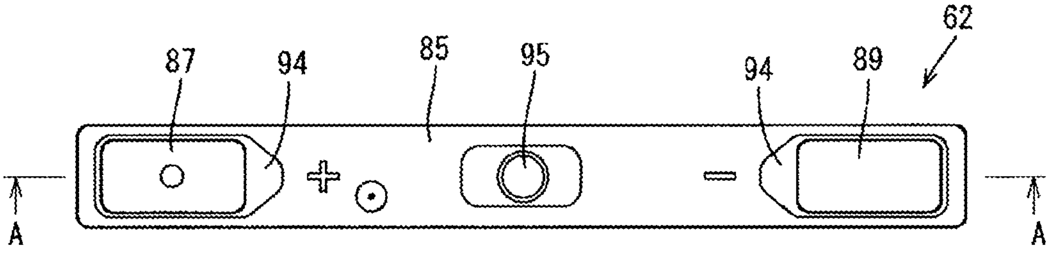
FIG. 3 is a plan view of a secondary battery.
Figure 4:
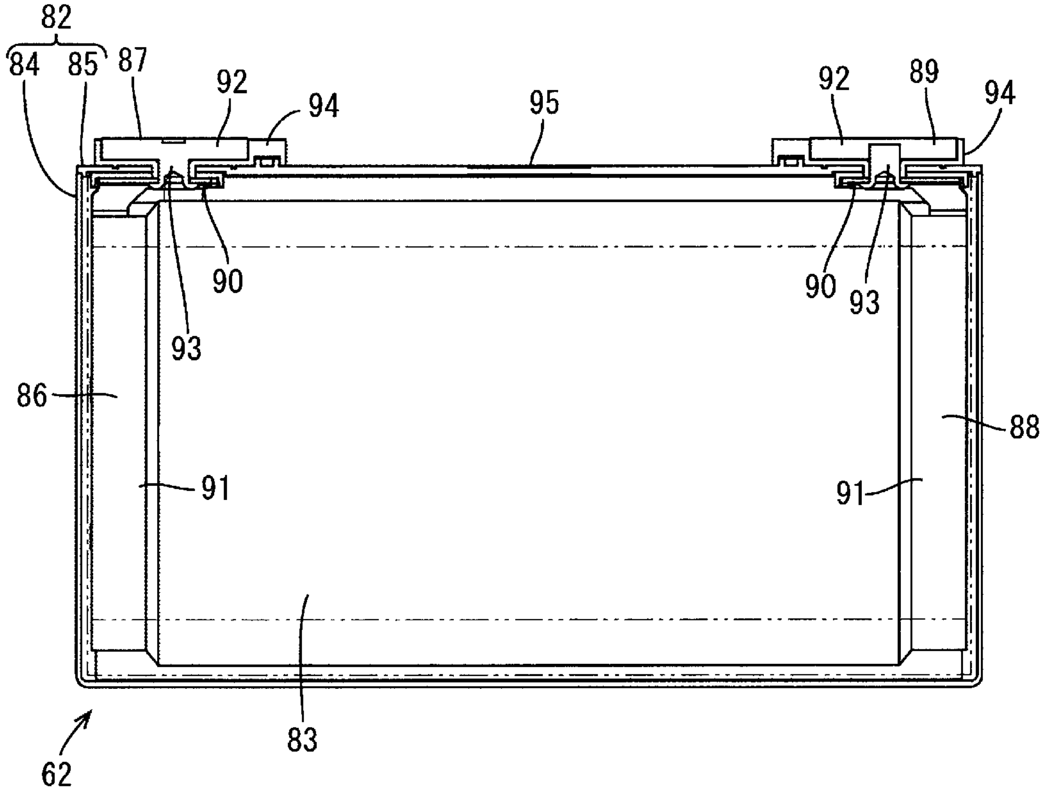
FIG. 4 is a cross-sectional view taken along a line A-A in FIG. 3.

As illustrated in FIG. 3 and FIG. 4, the secondary battery cell 62 is configured such that an electrode assembly 83 is accommodated in a case 82 having a rectangular parallelepiped shape together with a nonaqueous electrolyte. The secondary battery cell 62 is, as an example, a lithium ion secondary battery. The case 82 includes a case body 84 and a lid 85 that closes an opening portion formed at an upper portion of the case body 84.

Although not illustrated in detail, the electrode assembly 83 is formed such that a separator formed of a porous resin film is disposed between a negative electrode element that is formed by applying an active material to a substrate formed of a copper foil, and a positive electrode element that is formed by applying an active material to a substrate formed of an aluminum foil. These elements all have a strip shape, and wound in a flat shape so as to be accommodated in the case body 84 in a state where the position of the negative electrode element and the position of the positive electrode element are displaced toward opposite sides in the width direction with respect to the separator.

A positive electrode terminal 87 is connected to the positive electrode element via a positive electrode current collector 86, and a negative electrode terminal 89 is connected to the negative electrode element via a negative electrode current collector 88. The positive electrode current collector 86 and the negative electrode current collector 88 are each formed of a flat plate-like pedestal portion 90 and a leg portion 91 extending from the pedestal portion 90. A through hole is formed in the pedestal portion 90. The leg portion 91 is connected to the positive electrode element or the negative electrode element.

The positive electrode terminal 87 and the negative electrode terminal 89 each include: a terminal body portion 92; and a shaft portion 93 protruding downward from a center portion of a lower surface of the terminal body portion 92. In such a configuration, the terminal body portion 92 and the shaft portion 93 of the positive electrode terminal 87 are integrally formed with each other using aluminum (a single material). In the negative electrode terminal 89, the terminal body portion 92 is made of aluminum, and the shaft portion 93 is made of copper. The negative electrode terminal 89 is formed by assembling the terminal body portion 92 and the shaft portion 93 to each other. The terminal body portion 92 of the positive electrode terminal 87 and the terminal body portion 92 of the negative electrode terminal 89 are disposed at both end portions of the lid 85 via gaskets 94 made of an insulating material. The terminal body portion 92 of the positive electrode terminal 87 and the terminal body portion 92 of the negative electrode terminal 89 are exposed outward from the gaskets 94.

The lid 85 has a pressure release valve 95. The pressure release valve 95 is positioned between the positive electrode terminal 87 and the negative electrode terminal 89. The pressure release valve 95 is released when an internal pressure in the case 82 exceeds a limit value so as to lower the internal pressure in the case 82.

Figure 5:
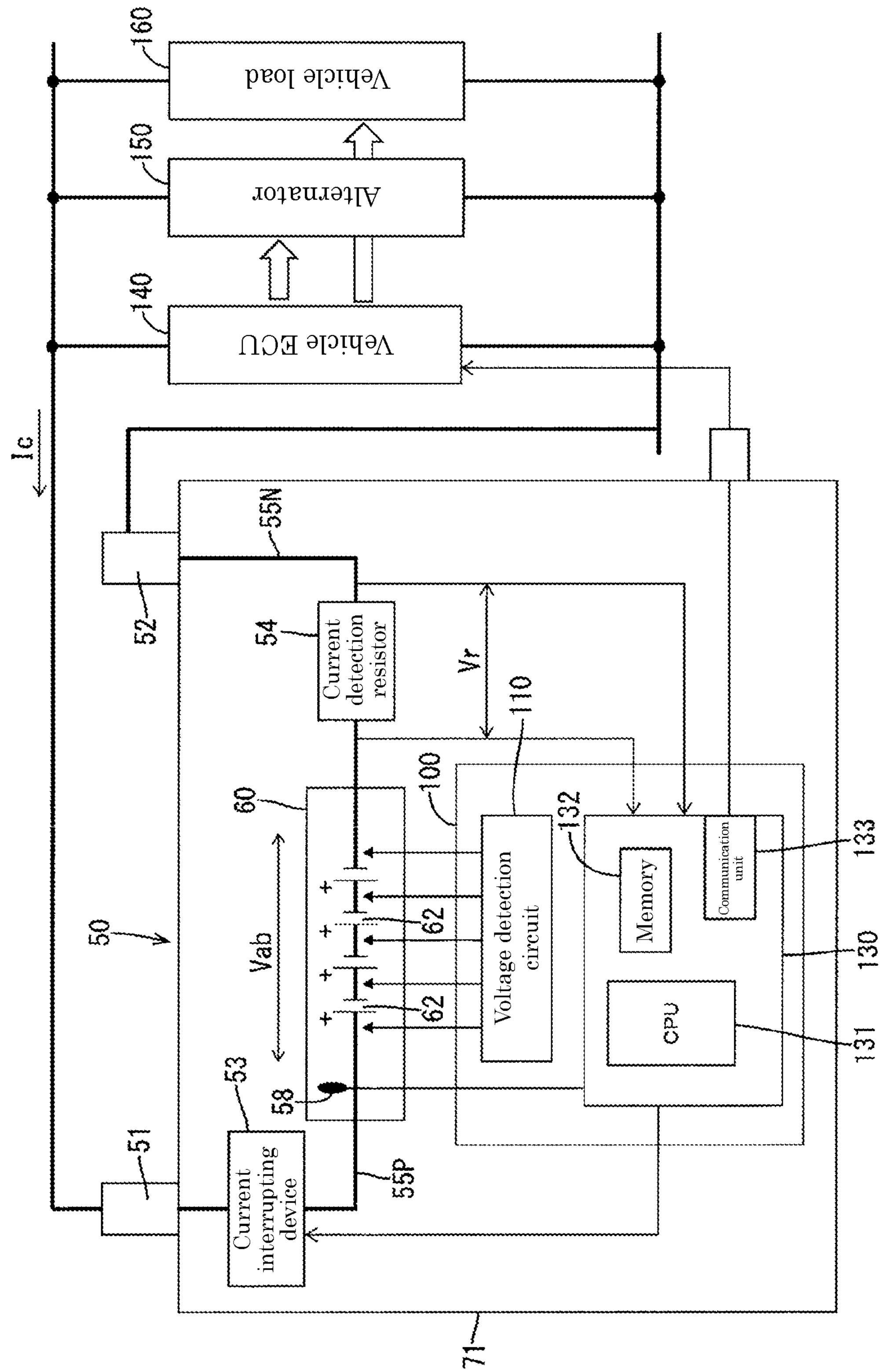

FIG. 5 is a block diagram illustrating an electrical configuration of the battery 50. The battery 50 includes the assembled battery 60, a current detection resistor 54, a current interrupting device 53, a voltage detection circuit 110, a management unit 130, and a temperature sensor 58.

Two external terminals 51, 52 of the battery 50 are electrically connected to a vehicle electronic control unit (ECU) 140, an alternator 150 that is a generator for generating electricity by the power of the engine 20, and a vehicle load 160 that is formed of various electrical components or the like mounted on the vehicle 10. The vehicle ECU 140 controls the alternator 150 and the vehicle load 160. The control of the alternator 150 includes a control of an output current (a charge current Ic of the battery 50). The control of the output current may be a PWM control or a voltage adjustment.

In a case where an electricity generation amount of the alternator 150 is larger than the power consumption of the vehicle load 160 during driving of the engine 20, the battery 50 is charged by the alternator 150. In a case where the electricity generation amount of the alternator 150 is smaller than the power consumption of the vehicle load 160, the battery 50 discharges electricity to compensate for a shortage of electricity. In a state where the engine 20 is stopped, the alternator 150 stops the electricity generation. Accordingly, the battery 50 is brought into a state where the supply of electricity to the battery 50 is stopped (not charged with electricity), that is, in a state where only discharging of electricity to the vehicle load 160 is performed.

The assembled battery 60 is formed of a plurality of secondary battery cells 62. Twelve secondary battery cells 62 are connected with each other in three parallels and four series. In FIG. 5, three secondary battery cells 62 that are connected in parallel are indicated by one battery symbol. The secondary battery cell 12 is an example of an "energy storage cell". A rated voltage of the battery 50 is 12 V.

The assembled battery 60, the current interrupting device 53 and the current detection resistor 54 are connected in series via a power line 55P and a power line 55N. As the power lines 55P, 55N, a bus bar BSB which is a plate-like conductor made of a metal material such as copper can be used. The power line 55P and the power line 55N are examples of a "current path".

The power line 55P is a power line that connects a positive external terminal 51 and a positive electrode of the assembled battery 60. The power line 55N is a power line that connects a negative external terminal 52 and a negative electrode of the assembled battery 60.

The current interrupting device 53 is positioned on a positive electrode side of the assembled battery 60, and is disposed on the power line 55P on a positive electrode side. The current interrupting device 53 is a semiconductor switch such as an FET or a relay. The current interrupting device 53 is normally closed, and is controlled to be closed in a normal operation state.

When abnormality is detected in the battery 50, a current I is cut off by switching the current interrupting device 53 from a closed state to an open state and hence, it is possible to protect the battery 50.

The current detection resistor 54 is positioned on a negative electrode side of the assembled battery 60, and is disposed on the power line 55N on a negative electrode side. By detecting a voltage Vr across the current detection resistor 54, a current I that flows through the assembled battery 60 can be measured.

The voltage detection circuit 110 can detect voltages V of respective secondary battery cells 62 and a total voltage Vab of the assembled battery 60.

The management unit 130 is mounted on the circuit board 100 and includes a CPU 131, a memory 133, and a communication unit 133. The management unit 130 is an example of a "control unit".

Figure 9:
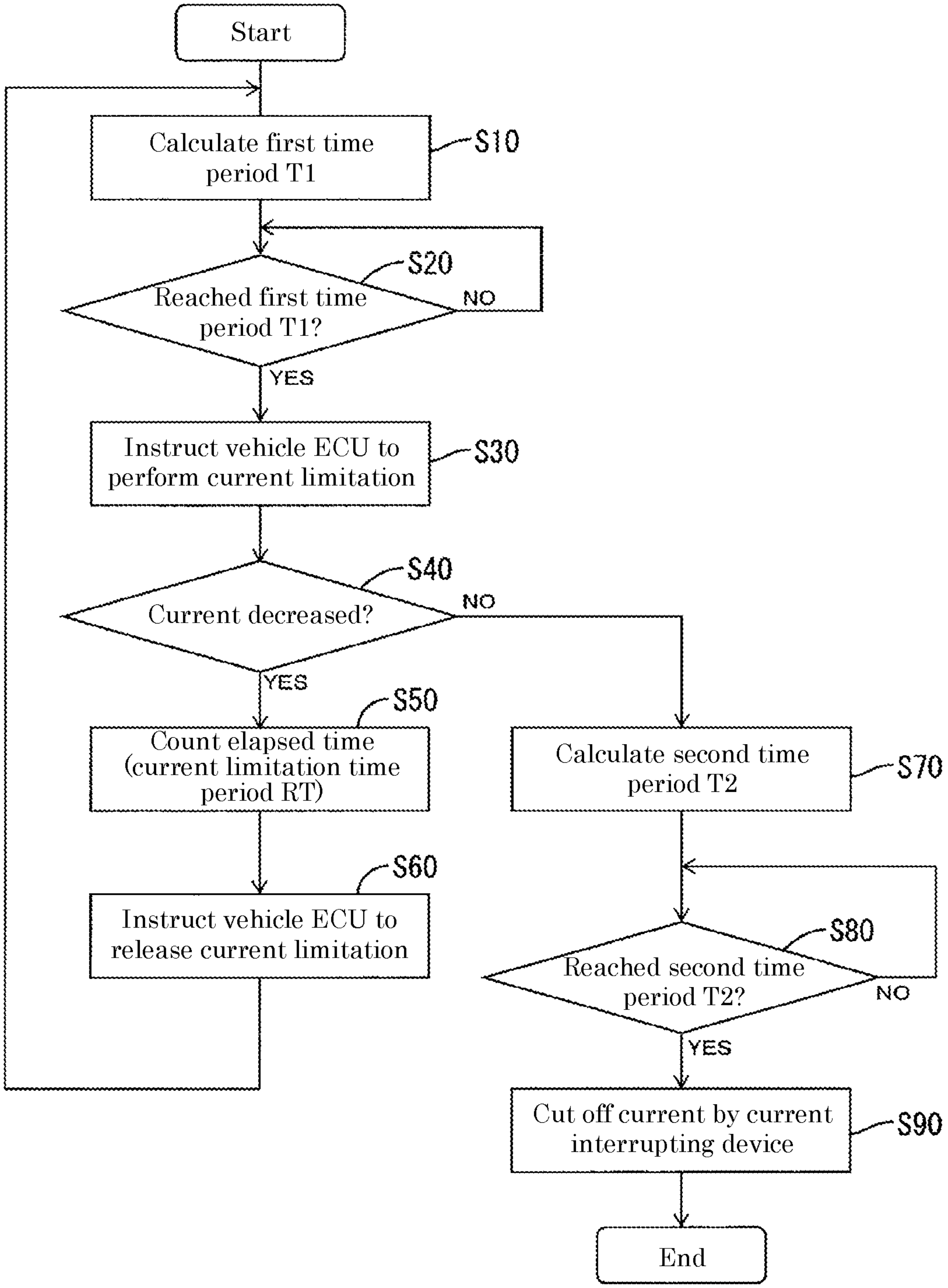
FIG. 9 is a flowchart of temperature management processing of a component to which electricity is supplied.

The memory 133 stores a program for performing the temperature management processing illustrated in FIG. 9, and data necessary for executing the program. The data includes data on I-T characteristics X1 and X2 illustrated in FIG. 7. The data on the I-T characteristics X1 and X2 may be held by an approximate expression approximating the graph in FIG. 7, or may be held by a map where I and T are stored in correlation with each other.

The management unit 130 manages the state of the battery 50 based on an output of the voltage detection circuit 110, an output of the current detection resistor 54, and an output of the temperature sensor 58. The communication unit 133 is electrically connected to the vehicle ECU 140 by a signal line and communicates with the vehicle ECU 140.

The management unit 130 measures a current I of the assembled battery 60 based on the voltage Vr between both ends of the current detection resistor 54. The management unit 130 measures the voltages V of the respective secondary battery cells 62 based on an output of the voltage detection circuit 110.

The temperature sensor 58 is fixed to the assembled battery 60, and detects the temperature of the assembled battery 60. The management unit 130 monitors a temperature TC of the assembled battery 60 based on an output of the temperature sensor 58.

The battery 50 does not have other temperature sensors except for the temperature sensor 58 for the assembled battery. Therefore, the temperatures cannot be measured except for the temperature of the assembled battery 60. That is, none of the temperatures of the components to which electricity is supplied such as the current interrupting device 53, the current detection resistor 54, the bus bar BSB and the like can be measured.

The management unit 130 operates using the assembled battery 60 as a power source, and constantly monitors the state of the battery 50 based on the data om the current I, the voltage V, and the temperature TC measured at a predetermined measurement cycle.

2. Temperature Management and Protection of Components to which Electricity is Supplied The current interrupting device 53, the current detection resistor 54, and the bus bar BSB are components to which electricity is supplied located in the current path of the assembled battery 60. The components to which electricity is supplied 53, 54 and BSB are components to be energized in accordance with charging/discharging of the assembled battery 60. The components to which electricity is supplied 53, 54 and BSB generate heat by Joule heat brought about by charging/discharging.

When the components to which electricity is supplied 53 and 54 and the BSB abnormally generate heat, the deterioration is accelerated and the safety is lowered. Therefore, it is desirable to manage the temperatures of the components to which electricity is supplied 53 and 54 and the BSB.

However, although the battery 50 includes the temperature sensor 58 for the assembled battery, the battery 50 does not include temperature sensors for measuring the temperatures of the components to which electricity is supplied 53, 54, and the BSB.

Hereinafter, by making use of a measured value of the temperature sensor 58 for the assembled battery, the configuration that manages a temperature of the current interrupting device 53 which is the component to which electricity is supplied is described.

In a state where the battery 50 is in a thermally equilibrium state, the temperature of the current interrupting device 53 that is the component to which electricity is supplied agrees with the temperature with assembled battery 60. The current interrupting device 53 has a smaller heat capacity than that of the assembled battery 60 and hence, with respect to a change in temperature associated with charging/discharging, the current interrupting device 53 exhibits a larger value than that of the assembled battery 60. Accordingly, due to charging/discharging, a difference in temperature of the current interrupting device 53 with respect to the assembled battery 60 is increased.

Figure 6:
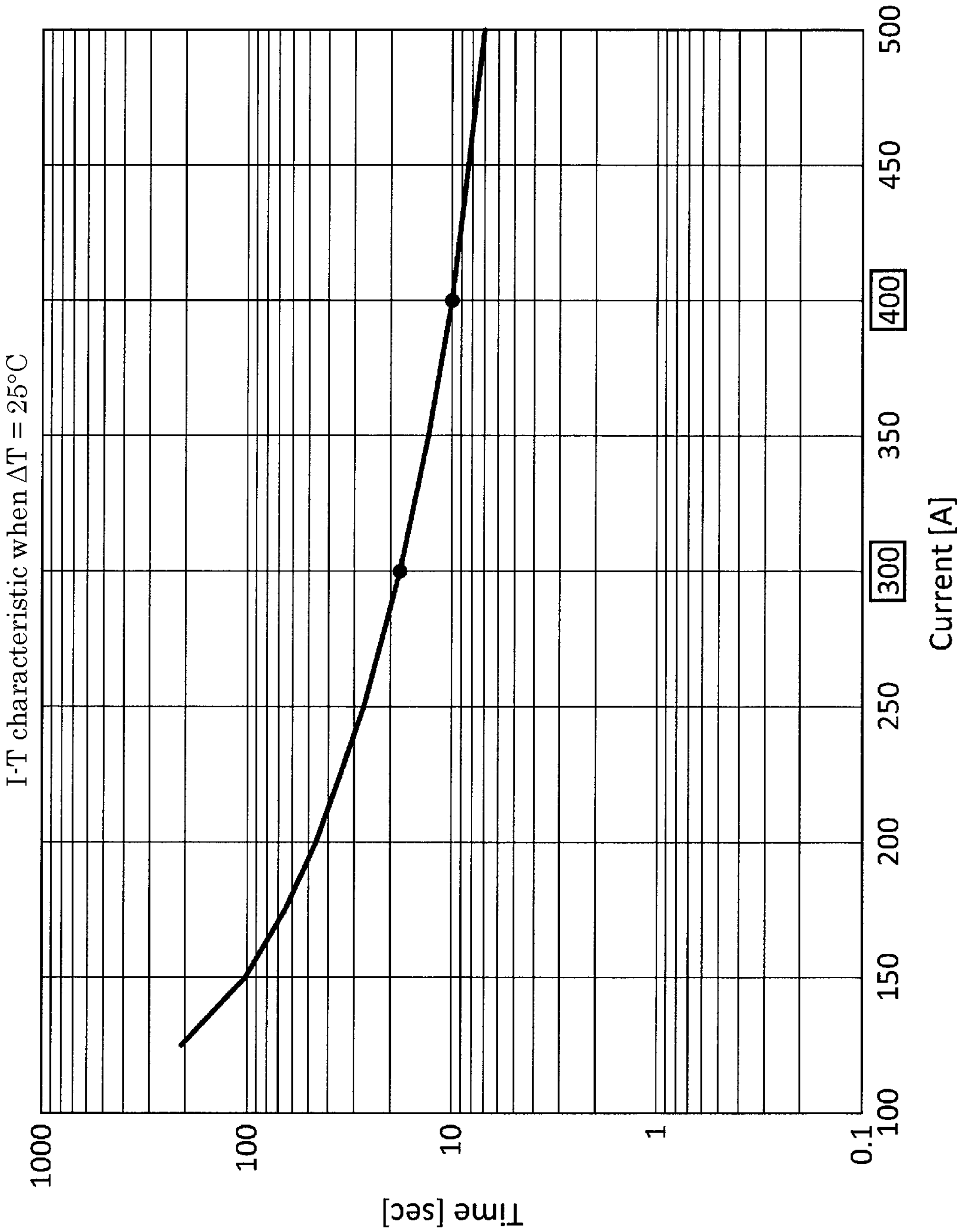
FIG. 6 is a graph illustrating an I-T characteristic of a component to which electricity is supplied.

FIG. 6 is a graph illustrating I-T characteristic of the current interrupting device 53. The I-T characteristic indicates the relationship between "magnitude of current I" and "electricity supply time period T" when the component to which electricity is supplied (current interrupting device 53) performs a change in temperature due to Joule heat.

FIG. 6 illustrates the I-T characteristic in a case where ΔT=25° C. For example, in a case where the current I=300 [A], the electricity supply time period T is approximately 18 [sec], and a temperature of the current interrupting device 53 is increased by 25° C. In a case where the current I=400 [A], the electricity supply time period T is approximately 10 [sec], and a temperature of the current interrupting device 53 is increased by 25° C.

That is, by referencing the I-T characteristic, it is possible to determine the electricity supply time period (hereinafter referred to as a first time period T1) from starting of charging or discharging to a point of time that the temperature increase of the current interrupting device 53 becomes ΔTcnt that is a first threshold. As an example, ΔTcnt is 25° C.

When the first time period T1 elapses after starting of charging/discharging (after starting of charging/discharging again in a case the current limitation is performed), the current limitation is performed. The current limitation is the processing where a current is limited to zero or a predetermined value or less so as to prevent the further increase of a temperature of the current interrupting device 53 that is the component to which electricity is supplied. For example, the current limitation is performed at timings t2, t6 indicated in FIG. 8.

By continuing the current limitation for a predetermined period, the increase of the temperature of the current interrupting device 53 can be suppressed and hence, a difference in temperature between the current interrupting device 53 and the assembled battery 60 can be decreased and is suppressed to ΔTcnt or less. Then, at a stage where the temperature of the assembled battery 60 and the temperature of the current interrupting device 53 return to an approximately equilibrium or the difference in temperature becomes a predetermined value or less, the current limitation is released. It is needless to say that the predetermined value is smaller than ΔTcnt.

With respect to the current limitation, the management unit 130 transmits an instruction to the vehicle ECU 140, and the vehicle ECU 140 performs the current limitation after receiving the instruction.

A case is considered where even when the management unit 130 instructs the vehicle ECU 140 to perform the current limitation, the vehicle ECU 140 assigns priority to charging and does not perform the current limitation. For example, at the time of decreasing a speed of the vehicle, a case is considered where the management unit 130 assigns priority to regenerative charging and does not perform the current limitation.

Figure 8:
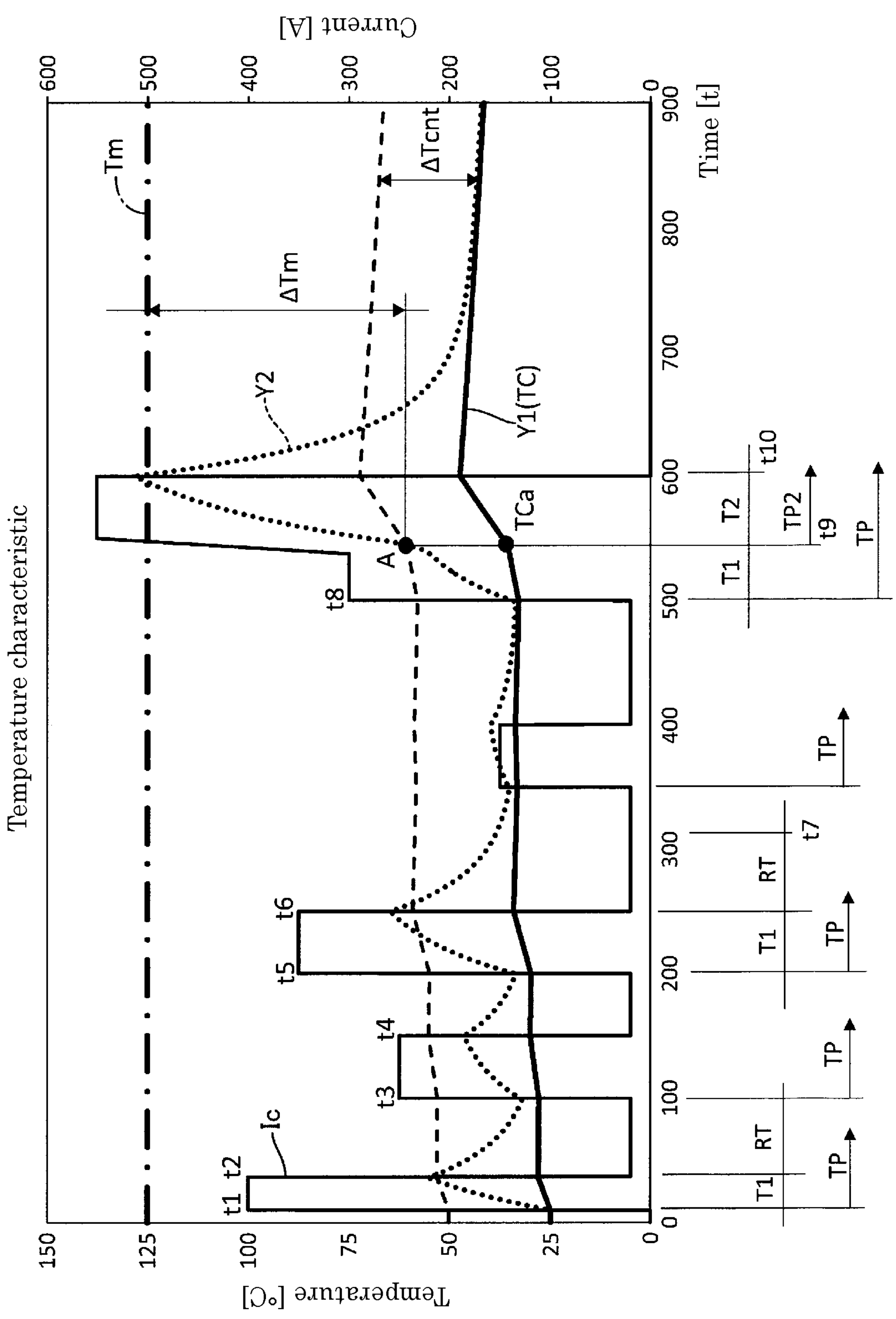
FIG. 8 is a graph illustrating temperature characteristics of an assembled battery and a component to which electricity is supplied.

In a case where the vehicle ECU 140 continues a control by assigning priority to charging, even after the first time period T1 elapses and a change in temperature of the current interrupting device 53 reaches ΔTcnt, the temperature of the current interrupting device 53 is increased (after a point of time in t9 in FIG. 8).

The change in temperature ΔTm until the current interrupting device 53 whose temperature is increased reaches an allowable temperature Tm after the lapse of the first time period T1 can be calculated by the following Expression (1). The allowable temperature Tm is an upper limit temperature that allows the normal operation of the current interrupting device 53. As an example, the allowable temperature is 125° C.

$$\Delta Tm = Tm - (TCa + \Delta Tcnt) \quad (1)$$

TCa is a temperature of the assembled battery at a point of time that the first time period T1 has elapsed from restarting of charging (a point A in FIG. 8). ΔTcnt is a first threshold.

The second term of a right side in Expression (1) indicates a temperature of the current interrupting device 53 at a point of time that the first time period T1 has elapsed from restarting of charging (the point A in FIG. 8).

The electricity supply time period with respect to ΔTm (hereinafter referred to as a second time period T2) can be obtained based on a current value of the assembled battery 60 and the I-T characteristic of the current interrupting device 53.

Accordingly, at a stage (a point of time t10 in FIG. 8) that the second time period T2 has elapsed from the point of time (the point of time t9 in FIG. 8) that the first time period T1 has elapsed after restarting of charging (after starting of charging after releasing the current limitation), the current interrupting device 53 is opened so that the charge current Ic can be cut off thus suppressing the current interrupting device 53 to an allowable temperature Tm or less.

Figure 7:
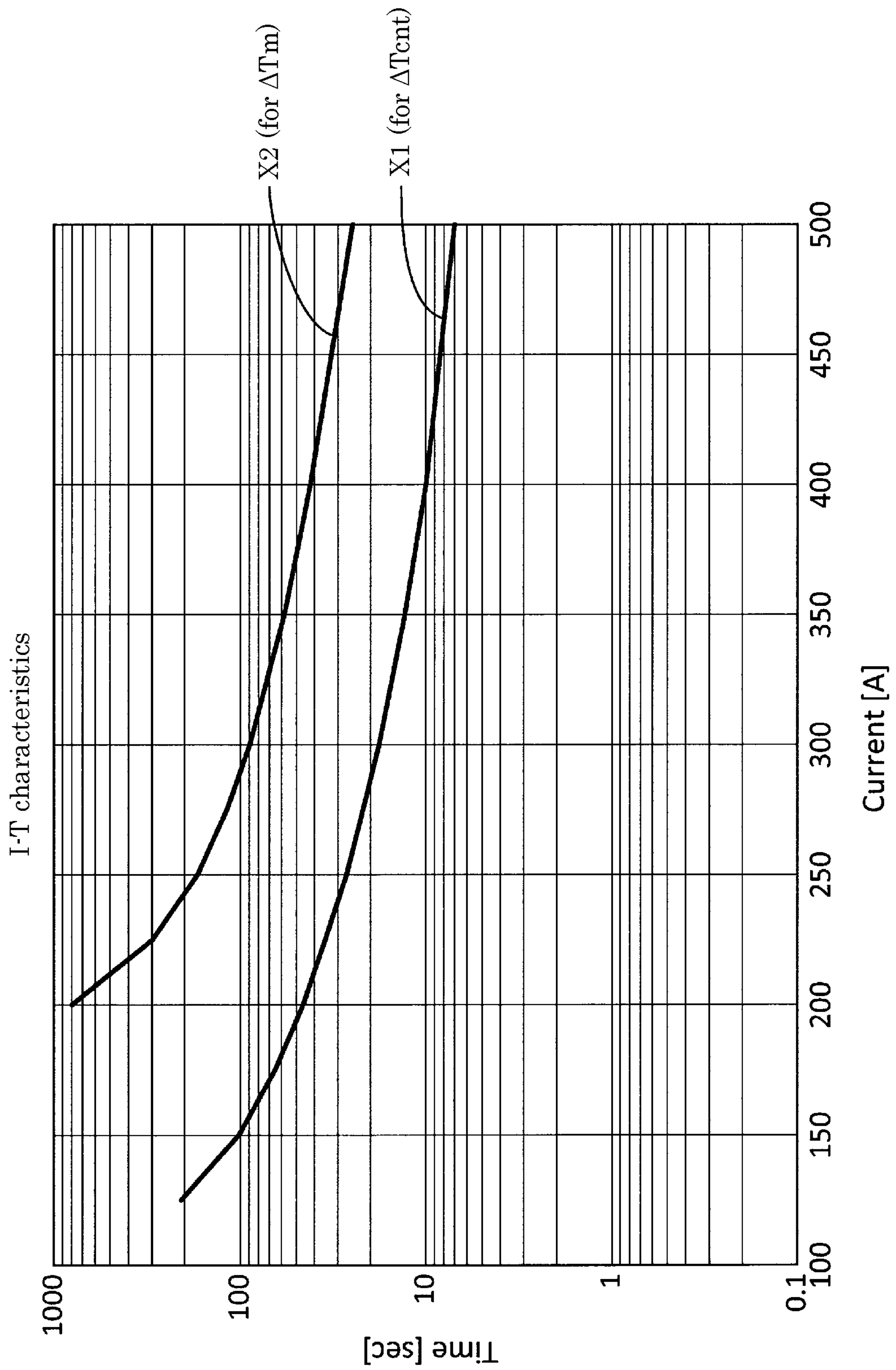
FIG. 7 is a graph illustrating an I-T characteristic of a component to which electricity is supplied.

As illustrated in FIG. 7, the temperature control of the current interrupting device 53 requires at least two I-T characteristics for ΔTcnt and ΔTm. "X1" indicates the I-T characteristic for ΔTcnt, and "X2" indicates the I-T characteristic for ΔTm.

ΔTcnt is a constant and hence, it is sufficient to provide only one I-T characteristic for ΔTcnt. ΔTm depends on a temperature of the assembled battery 60 at the point of time that the first time period T1 has elapsed from starting of charging (the point of time t9). Accordingly, for example, a plurality of I-T characteristics for ΔTm may be prepared at intervals of several V, and the I-T characteristic close to the value of ΔTm may be selected from these I-T characteristics.

FIG. 8 is a graph illustrating a temperature characteristic of the assembled battery 60 and a temperature characteristic of the current interrupting device 53 when the current limitation is performed during charging. In the graph, time [sec] is taken on an axis of abscissas and a charge current [A] and a temperature [° C.] are taken on an axis of ordinate. "Y1" indicates the temperature characteristic of the assembled battery 60, and "Y2" indicates the temperature characteristic of the current interrupting device 53.

In an initial state (point of time: 0), the battery 50 is thermally balanced, and the temperature of current interrupting device 53 substantially agrees with the temperature of the assembled battery 60.

At the point of time t1, charging starts, so that the assembled battery 60 is charged with a current of approximately 400[A]. The temperature of the assembled battery 60 and the temperature of the current interrupting device 53 are increased due to Joule heat brought about by charging.

A change in temperature of the current interrupting device 53 reaches ΔTcnt at the point of time t2, and the management unit 130 instructs the vehicle ECU 140 to perform the current limitation.

During the current limitation, a charge current Ic is controlled to a predetermined value or less (several A or less as an example) by the vehicle ECU 140. A current limitation time period RT is approximately 60 seconds. At a point of time t3 that comes after 60 seconds elapses from the point of time t2, the management unit 130 instructs the vehicle ECU 140 to release the current limitation.

The current limitation time period RT may be treated as a time period that the current interrupting device 53 whose temperature is increased requires to lower its temperature by ΔTcnt. The current limitation time period RT can be obtained from experimental data of a change in temperature of the current interrupting device 53. The current limitation time period RT can be obtained using an empirical value besides experimental data. The current limitation time period RT is not limited to a time period necessary for the current interrupting device 53 to lower ΔTcnt. The current limitation time period RT can be adjusted by using such a time period as a reference value and by multiplying such a time period with a predetermined ratio α (0.8 as an example). The predetermined ratio α can be determined from a viewpoint of cooperativeness with a vehicle system.

After the point of time t3, the assembled battery 60 is charged with the current of approximately 250 [A]. Then, due to a change in a rotational speed of an engine or the like, at a point of time t4, the charge current Ic is substantially decreased to approximately several A.

During a period from the point of time t3 to the point of time t4, a change in temperature of the current interrupting device 53 is smaller than ΔTcnt. Accordingly, the current limitation is not performed. During a period from the point of time t4 to a point of time t5, the charge current Ic is very small and hence, a state where charging is substantially stopped is present.

After charging is restarted at the point of time t5, the assembled battery 60 is charged with a current of approximately 350[A]. After restarting of charging, the first time period T1 elapses at the point of time t6 and a change in temperature of the current interrupting device 53 reaches ΔTcnt, and the management unit 130 instructs the vehicle ECU 140 to perform the current limitation.

The current limitation time period RT is approximately 60 seconds, and at a point of time t7 that comes after 60 seconds elapse from the point of time t6, the management unit 130 instructs the vehicle ECU 140 to release the current limitation.

As described above, when the increase of the temperature of the current interrupting device 53 reaches ΔTcnt after starting of charging or discharging (after restarting of charging or discharging when current limitation has been performed), by providing the current limitation time period RT, it is possible to control the difference in temperature of the current interrupting device 53 with respect to the assembled battery 60 whose temperature has been measured within the approximately ΔTcnt.

During a time period from a point of time t8 to a point of time t10, regenerative charging is performed with respect to the assembled battery 60 as the vehicle decreases its speed. After the regenerative charging is started at the point of time t8, the first time period T1 elapses at the point of time t9, and the increase of the temperature of the current interrupting device 53 reaches ΔTcnt. The management unit 130 instructs the vehicle ECU 140 to perform the current limitation at the point of time t9.

As a result of the control performed by the vehicle ECU 140 where charging is continued while assigning priority on receiving of the regenerative charging (the charging being performed without performing the current limitation), even if the increase of temperature of the current interrupting device 53 from the point of time t8 at which the regenerative charging starts reaches ΔTcnt at the point of time t9, the temperature of the current interrupting device 53 does not decrease and further increases thereafter.

In a case where the current limitation is not performed, the management unit 130 obtains the second time period T2 from the above-mentioned Expression (1), and instructs the current interrupting device 53 to open at the point of time t10 that comes after the second time period T2 elapses from the point of time t9. As a result, the charge current Ic is cut off.

By performing the current interruption, the temperature of the current interrupting device 53 can be suppressed to an allowable temperature Tm or less. After the current interruption, the temperature of the current interrupting device 53 is decreased with the lapse of time. Then, the temperature of the current interrupting device 53 becomes equal to the temperature of the assembled battery 60 and is balanced.

FIG. 9 is a flowchart of the temperature management processing of the current interrupting device 53. The temperature management processing is formed of steps S10 to S90, and the processing is performed using the detection of charging or discharging as a trigger. Hereinafter, a case is described where the management unit 130 detects a charge current Ic from the alternator 150 to the battery 50, and starts the temperature management processing.

When the temperature management processing starts, the management unit 130 detects the charge current Ic based on a current measured value of the current detection resistor 54. Then, the first time period T1 with respect to the charge current Ic is calculated or determined based on the detected charge current Ic and the I-T characteristic for ΔTcnt (indicated by X1 in FIG. 7), (S10). Specifically, when the I-T characteristic is stored in the memory 133 in the form of an approximate expression, the first time period T1 is calculated based on the approximate expression. When the I-T characteristic is stored in the memory 133 in the form of a map, the first time period T1 is determined by referencing the map.

Thereafter, the management unit 130 counts a charging time period after starting of the charging (or after restarting of the charging). That is, the management unit 130 counts the electricity supply time period TP of the current interrupting device 53. For example, the electricity supply time period TP is counted from the point of time t1 indicated in FIG. 8. Then, the management unit 130 determines whether the electricity supply time period TP reaches the first time period T1 (S20). In a case where the electricity supply time period TP does not reach the first time period T1, the processing is held in a standby state.

When the electricity supply time period TP reaches the first time period T1, the management unit 130 instructs the vehicle ECU 140 to perform the current limitation (S30).

Thereafter, after the instruction of the current control is made, the management unit 130 determines whether the charge current Ic is decreased (S40). When the vehicle ECU 140 decreases an output of the alternator 150 in accordance with the instruction, the charge current Ic is decreased.

When the charge current Ic has been decreased to a value equal to or less than an estimated value (S40: YES), the management unit 130 counts an elapsed time period after a current limitation instruction is transmitted (S50).

When the elapsed time period after the transmission of the current limitation instruction reaches the current limit period RT, the management unit 130 instructs the vehicle ECU 140 to release the current limitation (S60).

Next, when it is determined that the charge current Ic has not been decreased to an estimated value (when the current limitation has not been performed) in S40, the management unit 130 detects the charge current Ic. Then, the second time period T2 with respect to the charge current Ic is calculated by referencing the detected charge current Ic and the I-T characteristic for ΔTm (indicated by X2 in FIG. 7) (S70).

The management unit 130 counts the electricity supply time period after the lapse of the first time period from starting of charging (or from restarting of charging) (the charging time period after the point of time t9 indicated in FIG. 8) TP2, and determines whether the electricity supply time period TP2 of the current interrupting device 53 has reached the second time period T2 (S80). In a case where the electricity supply time period TP2 does not reach the second time period T2, the processing is held in a standby state.

When the electricity supply time period TP2 reaches the second time period T2, the management unit 130 instructs the current interrupting device 53 to cut off the charge current Ic (S90).

3. Description of Advantageous Effects

With the configuration of this embodiment, the difference in temperature of the current interrupting device 53 with respect to the assembled battery 60 whose temperature is measured can be suppressed to ΔTcnt or less. Accordingly, it is possible to prevent the current interrupting device 53 from abnormally generating heat due to charging and/or discharging.

In a case where the current is not limited even if the management unit 130 instructs the vehicle ECU 140 to perform the current limitation, the management unit 130 opens the current interrupting device 53 so as to cut off the current at a stage where the second time period T2 has elapsed.

By making the current interrupting device cut off the current, the temperature of the current interrupting device 53 can be suppressed to an allowable temperature Tm or less. Accordingly, it is possible to suppress the current interrupting device 53 from abnormally generating heat.

With the configuration of this embodiment, the temperature of the component to which electricity is supplied such as the current interrupting device 53 can be managed. Accordingly, the safety of the battery 50 is increased. Further, the battery 50 can be used until the temperature of the component to which electricity is supplied reaches an allowable value. Accordingly, the energy storage apparatus according to this embodiment acquires an advantageous effect that the time period during which electricity can be supplied (the time period during which charging/discharging can be performed) can be prolonged and hence, the battery performance can be maximized.

Embodiment 2

In the first embodiment, the difference in temperature of the current interrupting device 53 with respect to the assembled battery 60 whose temperature is measured can be suppressed to ΔTcnt or less.

It is sufficient that the component to which electricity is supplied is a component that is positioned on the current path of the assembled battery 60. Besides the current interrupting device 53, the current detection resistor 54, the bus bar BSB and the like are also the components to which electricity is supplied.

Figure 10:
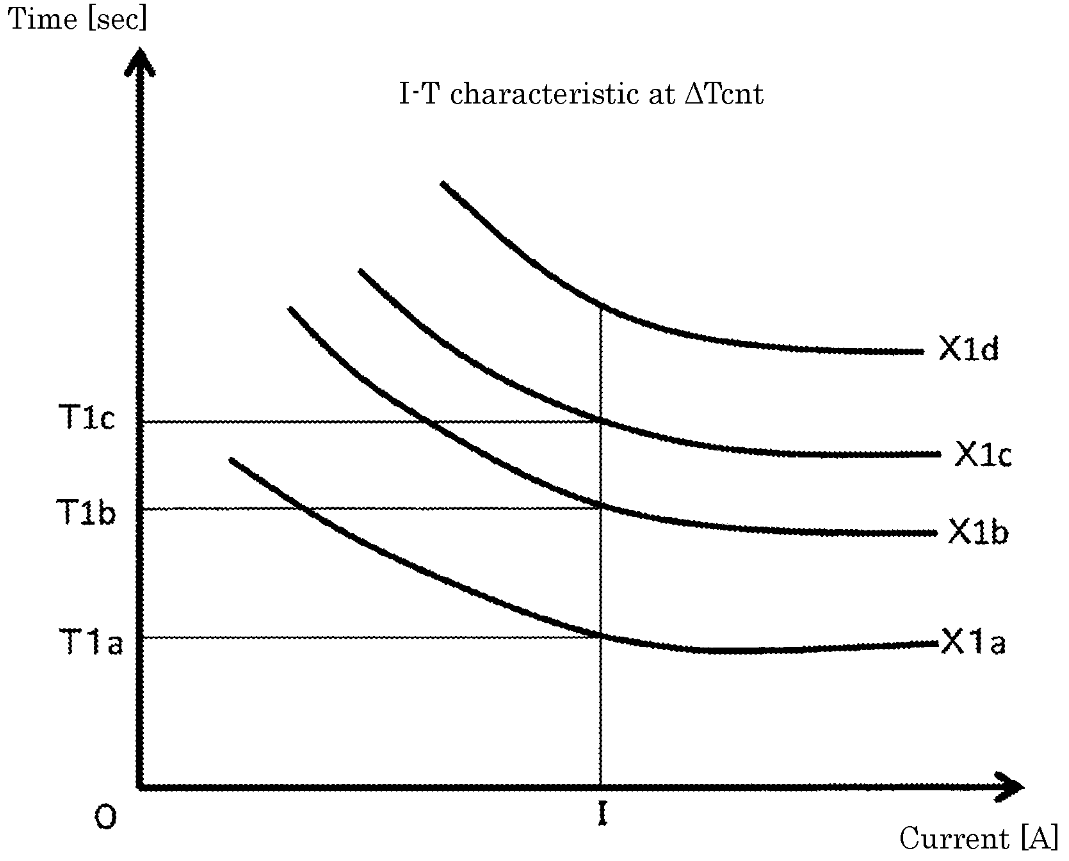
FIG. 10 is an I-T characteristic of a component to which electricity is supplied.

In the second embodiment, the temperature management is applied to a plurality of components to which electricity is supplied. FIG. 10 illustrates I-T characteristics at ΔTcnt. "X1*a*" is the I-T characteristic of a first component to which electricity is supplied, "X1*b*" is the I-T characteristic of a second component to which electricity is supplied, and "X1*c*" is the I-T characteristic of a third component to which electricity is supplied. "X1*d*" is the I-T characteristic of an assembled battery.

With respect to three I-T characteristics X1*a* to X1*c*, the electricity supply time period for the same current value is shorter in the order of I-T characteristic X1*a*, the I-T characteristic X1*b*, and the I-T characteristic X1*c*. That is, along with the charging/discharging of the assembled battery 60, a change in temperature is increased in the order of the first component to which electricity is supplied (X1*a*), the second component to which electricity is supplied (X1*b*), and the third component to which electricity is supplied (X1*c*).

The management unit 130 calculates the first time period T1 based on the I-T characteristic X1*a* of the first component to which electricity is supplied having the largest change in temperature among three components to which electricity is supplied having different I-T characteristics, and performs the temperature management processing illustrated in FIG. 9.

By performing the temperature management processing in this manner, the difference in temperature between three components to which electricity is supplied having different I-T characteristics and the assembled battery 60 whose temperature is measured can be maintained at ΔTcnt or less. Similarly to the first time period T1, the second electricity supply time period T2 may also be calculated based on the I-T characteristic X1*a* of the first component to which electricity is supplied.

Embodiment 3

In the third embodiment, a case where the I-T characteristics of the first component to which electricity is supplied and the second component to which electricity is supplied intersect with each other is described.

Figure 11:
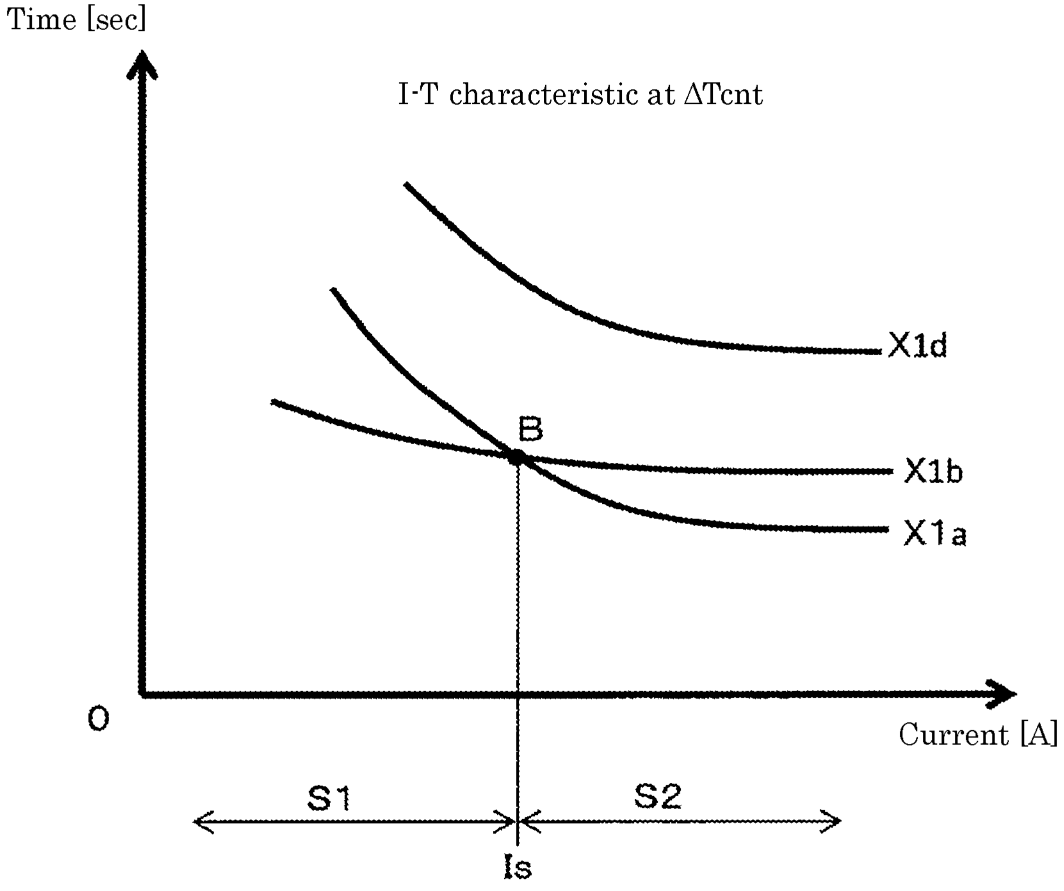
FIG. 11 is an I-T characteristic of a component to which electricity is supplied.

FIG. 11 illustrates I-T characteristics at ΔTcnt. "X1*a*" indicates the I-T characteristic of a first component to which electricity is supplied, "X1*b*" is the I-T characteristic of a second component to which electricity is supplied, and "X1*d*" is the I-T characteristic of an assembled battery. The I-T characteristic X1*a* and the I-T characteristic X1*b* intersect with each other at a point B.

In a region S1 disposed on the left side of point B, the I-T characteristic X1*b* is located below the I-T characteristic X1*a*. In the region S1, the electricity supply time period T for the same current value is shorter in the I-T characteristic X1*b* than in the I-T characteristic X1*a* and hence, the change in temperature in the I-T characteristic X1*b* is larger than the change in temperature in the I-T characteristic X1*a*.

In a region S2 disposed on the left side of point B, the I-T characteristic Xib is located below the I-T characteristic X1*a*. In the region S2, the electricity supply time period T for the same current value is shorter in the I-T characteristic Xia than in the I-T characteristic Xib and hence, the change in temperature in the I-T characteristic Xia is larger than the change in temperature in the I-T characteristic Xib.

In the region S1 (the region where the current value is equal to or less than Is), the management unit 130 calculates the first time period T1 based on the I-T characteristic Xib of the second component to which electricity is supplied, and performs the temperature management processing illustrated in FIG. 9. In the region B2 (the region where the current value is equal to or more than Is), the first time period T1 is calculated based on the I-T characteristic Xia of the first component to which electricity is supplied, and the temperature management processing illustrated in FIG. 9 is performed.

By performing the temperature management processing in this manner, the difference in temperature between the temperature of two component to which electricity is supplied whose I-T characteristics intersect with each other and the temperature of the assembled battery 60 whose temperature is measured can be maintained at ΔTcnt or less. Similarly to the first time period T1, the second electricity supply time period T2 may be calculated based on the I-T characteristic Xib of the second component to which electricity is supplied in the region of S1, and may be calculated based on the I-T characteristic Xia of the first component to which electricity is supplied in the region S2.

Other Embodiments

The present invention is not limited to the embodiments described with reference to the above description and drawings. For example, the following embodiments are also included in the technical scope of the present invention.

(1) The secondary battery cell 62 is not limited to the lithium ion secondary battery cell, and may be other non-aqueous electrolyte secondary battery cells. A lead-acid battery cell may also be used. The secondary battery cells 62 are not limited to be connected in series and in parallel, and may be connected in series or may be formed of a single cell.

(2) In the above embodiment, the battery 50 is a battery for a vehicle. The use of the battery 50 is not limited to a specific use. The battery 50 may be used in various applications such as a mobile object (for vehicles, ships, AGVs and the like) and an industrial application (an electric storage apparatus of an uninterruptible power supply system or a solar power generation system).

(3) In the first embodiment described above, the temperature management processing illustrated in FIG. 9 is performed with respect to the current interrupting device 53. However, the present invention is not limited the current interrupting device 53. For example, the temperature management processing illustrated in FIG. 9 may be performed with respect to the current detection resistor 54 or the bus bar BSB.

(4) In the above embodiment, ΔTcnt is set to 25° C., and the allowable temperature Tm of the current interrupting device 53 is set to 125° C. However, the case is described as an example, and the numerical values may be made different from the numerical values used in the embodiment.

(5) In the above embodiment, the first time period T1 and the second time period T2 are determined based on the I-T characteristics. The first time period T1 and the second time period T2 may be determined based on the $I^2$-T characteristic. The first time period T1 and the second time period T2 may be calculated by calculation based on the Joule heat generated in a component to which electricity is supplied due to charging/discharging of the secondary battery cell 62, a magnitude of a heat capacity of the component to which electricity is supplied, or the like.

(6) In the embodiment 1 described above, an example has been described where the temperature management processing illustrated in FIG. 9 is performed during charging of the assembled battery 60. The temperature management processing illustrated in FIG. 9 may be performed during discharging of the assembled battery 60. That is, when the electricity supply time period T of the component to which electricity is supplied due to discharging of the assembled battery 60 exceeds the first time period T1, the difference in temperature between the assembled battery 60 and the component to which electricity is supplied may be set to the first threshold ΔTcnt or less by limiting a current flowing through the assembled battery 60. When the processing is performed during discharging, the current limitation can be performed by stopping the load.

(7) When the assembled battery 60 performs "charging and discharging", an electricity supply time period of the components to which electricity is supplied due to "charging and discharging" of the assembled battery 60 (a total time of the electricity supply time period by a charge current and the electricity supply time period by a discharge current) T exceeds the first time period T1, the difference in temperature between the assembled battery 60 and the component to which electricity is supplied may be made equal to or less than the first threshold value ΔTcnt by limiting the current flowing through the assembled battery 60.

(8) In the embodiment 1, the battery 50 includes only the temperature sensor 58 for the assembled battery. However, the battery 50 does not include temperature sensors for measuring the temperatures of the components to which electricity is supplied. It is sufficient that the battery 50 has at least the temperature sensor 58 for the assembled battery. The battery 50 may have either the configuration that includes temperature sensors for measuring temperatures of components to which electricity is supplied or the configuration that does not include temperature sensors for measuring temperatures of component to which electricity is supplied. In a case where the temperature sensor that measures the temperature of the component to which electricity is supplied is provided, the difference in temperature between the assembled battery 60 and the component to which electricity is supplied can be more reliably suppressed to the first threshold ΔTcnt or less by using both the current limitation based on the measured value of the temperature sensor and the current limitation according to the present invention.

The invention claimed is:

1. An energy storage apparatus comprising:

an energy storage cell;

a temperature sensor configured to measure a temperature of the energy storage cell;

a component to which electricity is supplied, the component to which electricity is supplied being disposed on a current path of the energy storage cell and having a smaller heat capacity than that of the energy storage cell; and a control unit, wherein the control unit is configured to calculate or determine a first time period until a change in temperature of the component to which electricity is supplied reaches a first threshold based on a current that flows into the energy storage cell, the change in temperature being associated with charging and/or discharging of the energy storage cell, and the control unit is configured to limit the current that flows into the energy storage cell when an electricity supply time period associated with the charging and/or discharging of the energy storage cell exceeds the first time period thus setting a difference in temperature between the energy storage cell and the component to which electricity is supplied to a value equal to or less than the first threshold.

2. The energy storage apparatus according to claim 1, wherein the control unit is configured to determine the first time period based on an I-T characteristic indicating a relationship between a current and an electricity supply time period with respect to a change in temperature of the component to which electricity is supplied.

3. The energy storage apparatus according to claim 2, wherein in a case where there are a plurality of components to which electricity is supplied having different I-T characteristics, the control unit is configured to determine the first time period based on the I-T characteristic having the shortest electricity supply time period with respect to the same current value among the plurality of I-T characteristics.

4. The energy storage apparatus according to claim 2, wherein in a case where there are two components to which electricity is supplied and the I-T characteristics of the two components to which electricity is supplied intersect with each other, the control unit is configured to determine the first time period by selecting the I-T characteristic having the short electricity supply time period with respect to the same current value in two regions with an intersecting point interposed therebetween.

5. The energy storage apparatus according to claim 1, wherein in a case where the charging and/or discharging of the energy storage cell is not limited after a lapse of the first time period, the control unit is configured to calculate or determine a second time period until the change in temperature of the component to which electricity is supplied after the lapse of the first time period reaches a second threshold based on the current of the energy storage cell after the lapse of the first time period, and the control unit is configured to cut off the current in a case where the electricity supply time period associated with charging and/or discharging of the energy storage cell after the lapse of the first time period exceeds the second time period.

6. The energy storage apparatus according to claim 5, wherein the second threshold is set based on a difference in temperature between an allowable temperature of the component to which electricity is supplied and the temperature of the component to which electricity is supplied at a point of time of the lapse of the first time period.

7. The energy storage apparatus according to claim 1, wherein the energy storage apparatus is configured not to include a temperature sensor for the component to which electricity is supplied.

8. A method of managing a temperature of a component to which electricity is supplied having a smaller heat capacity than that of an energy storage cell used in an energy storage apparatus, the method comprising the steps of:

calculating or determining a first time period until a change in temperature of the component to which electricity is supplied reaches a first threshold based on a current that flows into the energy storage cell, the change in temperature being associated with charging and/or discharging of the energy storage cell; and limiting the current that flows into the energy storage cell when an electricity supply time period associated with the charging and/or discharging of the energy storage cell exceeds the first time period, thus setting a difference in temperature between the energy storage cell and the component to which electricity is supplied to a value equal to or less than the first threshold.

* * * * *